Patented May 29, 1945

2,377,267

UNITED STATES PATENT OFFICE 2,377,267

METAL SALTS OF ACYLATED HYDROXY-AROMATIC CARBOXYLIC ACID CONDENSATION PRODUCTS

Orland M. Reiff, Woodbury, N. J., assignor to Socony-Vacuum Oil Company, Incorporated, New York, N. Y., a corporation of New York No Drawing. Application February 25, 1942,
Serial No. 432,280

1 Claim. (Cl. 260—429)

This invention relates to the production of certain new chemical compounds or compositions which may be generally designated as the sulfides, selenides or tellurides (generically hereinafter sometimes referred to as sulf-selene-telides) of the metal carboxylate salts of the esters of nuclear alkyl-substituted hydroxyaromatic carboxylic acids and preferably the inorganic acid esters (acyls) of such hydroxyaromatic carboxylic acids. These compounds may also be generally designated as the sulfides, selenides or tellurides of the metal carboxylate salts of the acyloxyaromatic (or aroxyacyl) carboxylic acids, preference being given to such compounds in which the acyl group corresponds to an oxy inorganic acid (such as phosphorous acid).

It will be noted from the foregoing that the term "acyl" is used herein, both in the specification and in the claims, in a generic sense to include the acid radicals of both organic oxyacids (carboxylic acids) and inorganic oxyacids and designates the radicals of both organic and inorganic oxyacids which remain after the removal of one or more hydroxyl groups therefrom. This radical is the same, of course, as that remaining after removal of the halogen from the corresponding halide of the oxyacid since this halide, may be considered as resulting from the replacement of one or more of the hydroxyl groups of such oxyacids with an atom of halogen.

In other words, the compounds of the present invention are nuclear alkyl-substituted aromatic sulfides, selenides, or tellurides characterized by the presence of an aromatic nucleus having a nuclear hydrogen replaced by an ester (oxy-acyl) group and another nuclear hydrogen replaced by a carboxyl group the hydrogen of which is substituted with a metal. The preferred compounds of the present invention comprise those of the above general class in which the alkyl-substituent or group is a heavy alkyl group (preferably of not less than twenty carbon atoms). Another and more specifically preferred product of the present invention comprises an intimate mixture of compounds falling within the above general class wherein the characterizing acyl and metal-carboxylate groups and also the "interconnecting" divalent elements are the same and wherein the alkyl substituents in said compounds are attached to the aryl nuclei and consist essentially of hydrocarbon radicals corresponding substantially to the different aliphatic hydrocarbons contained in paraffin wax. This preferred product is hereinafter referred to as a wax-substituted compound (of the above general class).

With respect to the above mentioned heavy alkyl-substituted or wax-substituted compounds or compositions of the present invention, further preference is given within this group to those which are soluble in or miscible with mineral oil.

The addition agents of the present invention are considered to be condensation products wherein two or more of the aromatic nuclei of the characterizing acyloxyaromatic metal carboxylate groups are presumably interconnected through a linkage (or linkages) comprised of an element selected from the group consisting of sulfur, selenium, and tellurium, preference being given to sulfur. Through the introduction of sulfur, for example, in the manner or manners to be hereinafter described, I obtain what may be broadly termed a sulfide of an aroxy-acyl carboxylic acid in which the carboxyl hydrogen is substituted with its equivalent weight of metal. The carboxyl group may be attached directly to the aromatic nucleus or indirectly through an aliphatic chain although the former is the preferred type.

My preference for the above mentioned oil-miscible heavy alkyl-substituted or wax-substituted compositions is based upon the discovery that they are of multifunctional activity when blended with viscous mineral oil fractions in that they effect improvement of several unrelated and related properties of the oil. For example, this preferred oil-miscible group of compounds or compositions coming within the general field of invention contemplated herein are effective, when blended in a minor proportion with mineral oil fractions of the lubricant type, to depress the pour point, improve the viscosity index (V. I.), and inhibit oxidation of the oil. By inhibiting oxidation these oil-miscible compositions act to retard the formation of sludge and acidic products of oxidation. They also have a peptizing action on such sludge as may eventually be formed. Thus, any one of these preferred oil-miscible compounds or compositions may, for example, be used in internal combustion engine lubricants to retard or prevent the sticking of piston rings or prevent the corrosion of bearings, particularly those formed of alloy metals normally susceptible to corrosion, etc., and at the same time it will act to depress the pour point and improve the viscosity index of the oil. Through a proper choice of metal substituent (lead, copper, tin, or zinc, for example) the load-carrying capacity or "lubricity" of the oil may also be improved.

It should be understood that the use of these preferred oil miscible compounds or compositions is not confined to lubricating oils, but they may be employed in any mineral oil fractions where one or more of the improved properties recited above is desired. In this regard it is to be further understood that the present invention is not concerned with mineral oil compositions containing these preferred oil-soluble compounds, such oil compositions forming the subject matter of my copending application Serial No. 330,065, filed April 17, 1940, Patent No. 2,355,240, to which reference is made for further details in the composition of these compounds.

It is also to be understood that while our invention contemplates oil-miscible compounds or compositions of the type above referred to as a preferred class or group within the general field of invention, the invention is not limited to such oil-miscible compounds or compositions, since this whole class of new materials is possessed of valuable properties irrespective of oil-miscibility. For example, these compounds or compositions may be used as intermediaries in the production of resins, resin-like materials, rubber substitutes, etc. Certain of the compounds or compositions are possessed of valuable pharmaceutical, insecticidal, or similar properties, such, for example, as those derived from the presence of a particular metal in the carboxylate group. Numerous other uses and applications of the compounds or compositions contemplated herein will be readily apparent to those skilled in the art from the following description of their compositions and preferred methods of synthesis.

As previously pointed out the preferred compounds or compositions contemplated by this invention are characterized by the fact that at least one replaceable hydrogen on the aromatic nucleus is substituted with an aliphatic hydrocarbon radical or group characteristic of an aliphatic hydrocarbon of high molecular weight which we may term a heavy alkyl group. For obtaining the preferred group of compounds or compositions which are miscible with mineral oil and which possess the multi-functional oil-improving properties, we have found that this "heavy alkyl" substituent in the acyloxyaromatic-metal carboxylate salts under discussion must be derived from a predominantly straight chain aliphatic hydrocarbon of at least twenty carbon atoms such as characterize crystalline petroleum wax. As a matter of fact, petroleum wax is considered to be a preferred source of the "heavy alkyl" substituent and it is for that reason that the compounds or compositions described herein are referred to as "wax-substituted." It is to be understood, however, that the term "wax" as used herein, is applied in a broad sense and is intended to include any pure compound or mixture of compounds predominantly aliphatic in nature and containing at least twenty carbon atoms which is susceptible of attachment to an aromatic nucleus to provide a substituent which, in the proper proportions, will impart to the characterizing aroxyacyl metal carboxylate sulfide (or selenide or telluride) group or nucleus the multifunctional oil-improving properties referred to.

In the preferred group of compounds or compositions contemplated herein, which are oil-miscible and which by virtue of their heavy alkyl (wax) substituent have multifunctional properties in mineral oil blends, it is important that the heavy alkyl (wax) substituent comprise substantial proportion of the composition or compound as a whole. This will be discussed in detail later in the specification.

In addition to the heavy alkyl (wax) substituent the compounds or compositions contemplated herein, may have additional nuclear hydrogen replaced with other substituents which in the case of the preferred oil-miscible compositions may or may not have a solubilizing effect upon the composition as a whole. For example, part of the nuclear hydrogen may be substituted with a radical selected from the group consisting of: aliphatic hydrocarbon groups having less than twenty carbon atoms, hydroxyl, ester, xanthate, alkyl sulfide, aryl sulfide, keto, alkoxy, aroxy, aldehyde, oxime, aralkyl, aryl, alkaryl, halogen, nitroso, N-thio, N-acyl, cyano and (—H$_2$) formed by hydrogenation. Compounds of the above general formula-type are illustrated by the following specific formula:

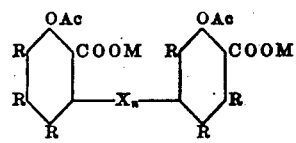

in which at least one of the R's represents an aliphatic radical or group containing at least twenty carbon atoms and in which the remaining R's represent residual hydrogen which may be replaced with a radical selected from the group consisting of: aliphatic groups containing less than twenty carbon atoms, hydroxyl, ester, xanthate, alkyl sulfide, aryl sulfide, keto, alkoxy, aroxy, aldehyde, oxime, aralkyl, aryl, alkaryl, halogen, nitroso, N-thio, N-acyl, cyano and (—H$_2$) formed by hydrogenation; and in which Ac represents an acyl group; and in which X represents a divalent element selected from the group consisting of sulfur, selenium and tellurium, and "$n$" represents the number of such divalent elements, from one to four or more; and in which the hexagonal ring represents a mono-, di- or tri-cyclic aromatic nucleus.

It will be understood of course that where the number of divalent elements (represented by X in the above formula) is greater than one they form a "chain" of such elements which are interconnected among themselves.

It will also be understood that since the condensation reaction (hereinafter described) which is employed in synthesizing the sulfides, etc., contemplated herein, is presumably attended by a certain amount of multiple condensation, such further condensed compounds, herein called polymers, are included herein within the terms sulfides, etc., and as coming within the general formula above. The general formulae corresponding to the polymers of this character will be readily understood from the above by those skilled in the art.

It is pointed out further that the term "sulfide," as used herein, is inclusive of the monosulfides, disulfides, trisulfides, tetrasulfides, etc.; that is, it includes both monosulfides and polysulfides and the corresponding rule applies to the terms "selenide" and "telluride."

It will be understood that the compounds or compositions contemplated by this invention may be pure compounds satisfying the conditions enumerated above with any one of the various mono- or polycyclic aromatic nuclei in the characterizing nuclear group. However, in manufacturing the preferred composition by the preferred procedure, as will appear later on, the final product obtained is normally or usually a mixture of different compounds the individual characteristics of which differ in their alkyl substituents (according to the different aliphatic hydrocarbons in an alkylating material such as paraffin wax); in the number of alkyl substituents on the characterizing nucleus and in the number of nuclei attached to a single long chain alkyl group. For further details in the composition of such mixtures of compounds reference is made to my aforesaid application Serial Number 330,065, filed April 17, 1940, Patent No. 2,355,240.

As aforesaid, it is important that the "wax-substituted" compounds of the present invention which are preferred for use as oil-improving agents have the aryl nucleus substituted with heavy alkyl groups to an extent such that this heavy alkyl ("wax") substituent comprises a sufficient proportion of the composition as a whole to render the same oil-miscible so that it will form a mineral oil solution or colloidal suspension which will remain stable as such under normal conditions of handling and use. It appears that there is a critical range in the degree of "wax"-substitution below which these "wax"-substituted compounds will not satisfy the requirements for oil-miscibility.

The critical range in the degree of wax-substitution of the aryl nucleus in the preferred compounds contemplated herein may vary with: (a) the mineral oil fraction in which the compound is used; (b) whether the aryl nucleus is mono- or polycyclic or mono- or polyhydric; (c) mono- or polysubstitution of the aryl nucleus with heavy alky groups; and (d) other substituents on the nucleus which may be of positive or negative or of neutral oil-solubilizing activity.

In view of the foregoing variables it would be impracticable and probably misleading to attempt to give an expression and figure which would indicate accurately the proper ratio of hydroxyaromatic constituent to the "wax"-substituted hydroxyaromatic constituent in the starting material which would satisfy all cases taking these variables into account. As a guide for preparing these preferred compounds, however, our research indicates that in general the ratio, expressed as weight of hydroxyaromatic component in the product to the corresponding wax-substituted hydroxyaromatic nucleus or component therein, should not be greater than about seventeen parts by weight of the former to about 100 parts by weight of the latter, or about 17 per cent, when the hydroxyaromatic component is expressed in terms of its chemically equivalent weight of phenol. This ratio, hereinafter designated as the "phenolic ratio," does not take into account other substituents on the nucleus, but it will serve as a working guide for the preparation of these preferred compounds. A further general guide for the synthesis of these preferred compounds is to substitute the aryl nucleus with paraffin wax or equivalent alkyl substituent so that it is polysubstituted.

It is again pointed out that the condensed sulfur derivatives or sulfides of the alkylated acylated hydroxyaromatic carboxylic acid salts (or metal carboxylates) are the preferred class of addition agents contemplated herein. For that reason and for the sake of simplicity the invention, with special reference to methods of preparation of the compositions involved, is hereinafter specifically described with reference to the sulfides, but it is to be understood that the corresponding selenides and tellurides are contemplated by and come within the scope of the broad invention.

One general procedure for synthesizing the mono- and poly-sulfides of the acylated alkyl-substituted hydroxyaromatic carboxylic acid salts of the type contemplated herein involves the condensation of the corresponding alkylated hydroxyaromatic carboxylic acid with sulfur or sulfur halides, followed by the acylation of the hydroxyl group and subsequent substitution of the carboxyl hydrogen with the desired metal. In the above general procedure an alkali or alkaline earth metal salt of the alkyl substituted hydroxyaromatic carboxylic acid (preferably the corresponding sodium phenate-sodium carboxylate), may be employed as the starting material in place of the free acid as will be more fully explained further on in connection with a specific example of this general method.

In the event sulfur dichloride ($SCl_2$) is used in the general procedure described above, the condensation product will be in the nature of a monosulfide (or a condensate or polymer thereof); sulfur monochloride ($S_2Cl_2$) will yield the corresponding disulfide (or a condensate or polymer thereof) and, of course, a mixture of sulfur halides may be employed to yield a mixture of such sulfides. Also, elementary sulfur may be employed as the condensation reagent.

Sulfur derivatives of higher sulfur content may be obtained by reacting a compound having a disulfide linkage (obtained with sulfur monochloride) with a sulfur or with alkali polysulfides or with an alkyl tetrasulfide. Such higher sulfur derivatives may also be obtained by first reducing the disulfide to form an aryl mercaptan or thio-phenol of the alkylated hydroxyaromatic acid (or alkali metal carboxylate) and then reacting the thio-phenol with sulfur dichloride (to form the trisulfide) or with sulfur monochloride (to form the tetrasulfide) of the alkylated hydroxyaromatic carboxylic acid (or alkali metal salt thereof), which can then be acylated and converted to a polysulfide of a salt of the desired metal in the aforesaid manner.

The alkylated hydroxyaromatic carboxylic acid (or alkali or alkaline earth metal salt thereof) used in the above general procedure in preparing the sulfides of the corresponding acylated derivatives may be obtained in various ways. For example, a hydroxyaromatic compound such as phenol or naphthol may first be alkylated to substitute part of the nuclear hydrogen with an alkyl group or groups preferably of sufficient size to impart oil-miscibility to the ultimate product. This alkylated hydroxyaromatic compound may then be converted to the corresponding hydroxyaromatic carboxylic acid by a suitable carboxylation procedure. For example, the alkylated hydroxyaromatic compound may be subjected to the Kolbe synthesis, described in detail in Patent No. 2,197,832, issued April 23, 1940, to form an alkali or alkaline earth metal carboxylate salt of the alkylated hydroxyaromatic acid, which may be used as the starting material in the above general procedure or, if desired, this salt may be acidified to form the corresponding carboxylic acid or converted to an alkali-phenate-alkali carboxylate (or the corresponding alkaline earth compound), either of which may also be employed as the starting material, as explained above.

The alkylation of the hydroxyaromatic compound may be carried out in various ways. A preferred procedure is to subject a hydroxyaromatic compound to a Friedel-Crafts condensation reaction with a halogenated aliphatic hydrocarbon, which for obtaining the preferred multifunctional addition agents for mineral oils, should be an aliphatic hydrocarbon containing at least twenty carbon atoms. Mixed alkyl or aralkyl aryl ethers may also be used in the formation of alkylated hydroxyaromatic compounds by the Friedel-Crafts reaction, rearrangement of the alkyl or aralkyl ether radical taking place to give the phenolic —OH group. This alkylation may also be carried out with an unsaturated aliphatic hydrocarbon or with aliphatic alcohols, using anhydrous aluminum chloride as a catalyst. For obtaining the preferred multifunctional addition agents for mineral oils the unsaturated hydrocarbons or aliphatic alcohols should be high molecular weight compounds containing at least twenty carbon atoms such, for example, as eicosylene, cerotene, melene, polymerized isobutylene, etc., or myricyl alcohol, ceryl alcohol, etc.

The Friedel-Crafts synthesis is preferred for obtaining the alkylated hydroxyaromatic compound, and as a source of the alkyl substituent preference is given to mixed high molecular weight hydrocarbons typified by those which characterize the heavier products of petroleum, such as heavy petroleum oils of the lubricant type, petrolatum and crystalline petroleum wax or other compounds which will result in relatively long chain aliphatic substituents. Special preference is given to petroleum wax of melting point not substantially less than about 120° F., which is predominantly characterized by aliphatic hydrocarbons having a molecular weight of about 350 and containing at least twenty carbon atoms.

Hydroxyaromatic compounds which may be used in the alkylation reaction are: mono- or poly-cyclic and mono- or poly-hydric hydroxyaromatic compounds which may or may not be otherwise substituted, as hereinafter indicated. Specific examples of compounds which may be used in this reaction are: phenol, resorcinol, hydroquinone, catechol, cresol, xylenol, hydroxydiphenyl, benzylphenol, phenylethyl phenol, phenol resins, methylhydroxydiphenyl, alpha and beta naphthol, xylyl naphthol, benzyl phenol, anthranol, phenylmethyl naphthol, phenanthrol, anisole, beta naphthyl methyl ether, chlorphenol, and the like. Preference in general is to the monohydroxy phenols otherwise unsubstituted, particular preference being given to phenol and alpha and beta naphthol.

Where it is desired to obtain a compound or condensation product in which the aryl nucleus contains in addition to, or instead of, residual hydrogen, a substituent of the type represented in the above general formula, it is pointed out that with the exception of substituents such as aralkyl, aryl, alkaryl, halogen, hydroxyl, and aroxy, such groups are introduced after alkylating and carboxylating the hydroxyaromatic compound. Methods for the introduction of these substituents into the simpler hydroxyaromatic compounds are well known to those skilled in the art and it has now been discovered that they are also applicable to the more complex hydroxyaromatic compounds employed in making the compositions of the present invention. It should also be pointed out that where nuclear substituents are present containing methylene groups such as alkyl, keto, ether, ester radicals, etc., the same may also carry substituents such as halogen, cyano, nitro, and thio groups. The general methods for introducing these groups into such nuclear substituents in the case of simpler compounds are well known to those skilled in the art and have also been found to be applicable here.

In the event it is desired to produce a product which contains an alkoxy or aroxy group as a substituent on the aryl nucleus, it is preferable to use an aryl hydroxide containing such substituent and effect the alkylation with a high molecular weight unsaturated aliphatic hydrocarbon (such as eicosylene, cerotene, melene, etc.) or a higher alcohol (such as myricyl alcohol, ceryl alcohol, etc.), using H₂SO₄ as a catalyst. By this procedure the hydroxyaromatic ether can be alkylated without substantial rearrangement taking place. As an alternative procedure, polyhydric phenols can be alkylated with higher alcohols or high molecular weight aliphatics or by Friedel-Crafts reaction, followed by substitution of one hydroxyl hydrogen with a low molecular weight alkyl group, which substitution can be effected by treating the alkylated polyhydric phenol with an alkali alcoholate to substitute an OH group with alkali metal and then treating with the desired alkyl halide whereby the substitution is effected.

When it is desired to obtain a nitro or amino substituent, the aryl hydroxide is alkylated or wax-substituted when free of such substituent. This is followed by nitration to introduce the nitro group. The amino group can be obtained by reduction of the nitro group.

In general it appears that any metal may be employed as the metal substituent, but preference is given to the group comprising barium, tin, aluminum, zinc, chromium and cobalt.

Examples of acyl chlorides of the inorganic acids of non-metallic or acidic metalloid elements that may be used in the acylation reaction mentioned above are the following: POCl₃, PSCl₃, BCl₃, SiCl₄, PCl₃, PCl₅, as well as the corresponding bromides and iodides.

As previously explained the term "acyl" as used in the preceding paragraph designates the radical of an inorganic oxyacid which remains after the removal of one or more hydroxyl groups therefrom. This radical is the same, of course, as that remaining after the removal of the halogen from the corresponding halide of the inorganic oxyacid since this halide may be considered as resulting from the replacement of one or more of the hydroxyl groups of the inorganic oxyacid with an atom of halogen, just as the halides of an organic carboxylic acid is formed by replacement of the hydroxyl group of the carboxyl group with an atom of halogen.

Representative examples of the organic acid anhydrides or acyl halides which may be used for this purpose are the anhydrides or acyl halides of the following organic acids:

(1) Saturated aliphatic mono carboxylic acids ranging from acetic to montanic acid.

(2) Unsaturated aliphatic monocarboxylic acids such as acrylic, oleic, elaidic, crotonic, etc.

(3) Saturated aliphatic polycarboxylic acids such as succinic, oxalic, adipic, sebacic, etc.

(4) Unsaturated aliphatic polycarboxylic acids such as maleic and fumeric acids.

(5) Substituted mono and polycarboxylic aliphatic acids containing halogen, hydroxyl, amino, ether or keto groups such as chloracetic acid, hydroxystearic acid, tartaric acid, glycollic acid, octyloxyacetic acid and pyroracemic acid.

(6) Aromatic monocarboxylic acids such as benzoic and naphthoic acids.

(7) Aromatic polycarboxylic acids such as phthalic acid.

(8) Alkylene-substituted aromatic monocarboxylic acids such as cinnamic acid.

(9) Aryl substituted mono and polycarboxylic aliphatic acids with carboxyl in the side chain such as phenylstearic, naphthyl stearic and naphthyl polystearic acids.

(10) Substituted aromatic mono and polycarboxylic acids containing halogen, hydroxyl, amino, alkyl, aryl, aralkyl, keto, nitro or alkoxy in the nucleus, such as chlorbenzoic, salicyclic, anthranilic, toluic, phenyl-benzoic, benzoylbenzoic, nitro-benzoic, and anisic acid.

(11) Non benzenoid cyclic mono and polycarboxylic acids such as abietic and camphoric acids, and heterocyclic carboxylic acids such as furoic acid.

Of the above organic acylating agents, those corresponding to the saturated aliphatic and aromatic acids are preferred. In most cases, compounds which impart higher V. I. to mineral oils can be prepared by use of the dibasic acid chlorides because of the formation of more resinous products thereby.

To illustrate the procedure which may be followed in preparing the compositions contemplated by this invention, I will now describe the various steps which may be followed in synthesizing the monosulfide or the disulfide of the stannous carboxylate of acylated wax-phenol carboxylic acid.

By the term "wax" in this connection I mean, as previously indicated, a mixture of higher aliphatic radicals or groups corresponding to the higher aliphatic hydrocarbons which characterize petroleum wax, the resulting product being, therefore, a mixture of the sulfide (mono- or di-) of the corresponding stannous carboxylate salts of the alkylated acylated phenol carboxylic acids.

The procedure to be followed in preparing other metal derivatives, other polysulfides, and other condensation products such as selenides and tellurides containing other alkyl substituents than those derived from petroleum wax and other aryl nuclei than that characterizing phenol will be obvious from the following description in the light of the foregoing.

The following description also illustrates the procedure which may be followed in making those compounds which are preferred for their multi-functional oil-improving properties. As will be apparent to those skilled in the art, compounds or compositions having a combined phenol content in excess of that necessary for oil-miscibility may be readily obtained by using a chlorinated wax having a chlorine content substantially higher than that given in the example below or by changing the ratio of the reactants (chlor-wax and phenolic compound).

ALKYLATION OF PHENOL

A paraffin wax melting at approximately 120° F. and predominantly comprised of aliphatic compounds having at least 20 carbon atoms in their molecules is heated to about 200° F., after which chlorine is bubbled therethrough until the wax has absorbed about 10 per cent to about 16 per cent of chlorine, such product having an average composition between that corresponding to a monochlor-wax and a dichlor-wax. A quantity of chlor-wax thus obtained containing 3 atomic proportions of chlorine is heated to a temperature varying from just above its melting point to not over 150° F., and 1 mol of phenol (hydroxybenzene) is admixed therewith. The mixture is heated to about 150° F., and a quantity of anhydrous aluminum chloride corresponding to about 3 per cent of the weight of the chlor-wax in the mixture is slowly added with active stirring. The rate of addition of the aluminum chloride should be sufficiently slow to avoid violent foaming, and during such addition the temperature is preferably held at about 150° F.; after the aluminum chloride has been added, the temperature of the mixture may be increased slowly to control the evolution of HCl gas to a temperature of from 250° F. to 300-350° F. If the emission of HCl gas has not ceased when the final temperature is reached, the mixture may be held at 330° F. for a short time to allow completion of the reaction, but to avoid possible cracking of the wax the mixture should not be heated appreciably above 350° F., nor should it be held at that temperature for any extended length of time. Removal of non-alkylated material (phenol) can be effected generally by water-washing, but it is preferable to treat the water-washed product with super-heated steam, thereby insuring complete removal of the unreacted material and accomplishing the drying of the product in the same operation.

A wax-substituted phenol prepared according to the above procedure in which a quantity of chlor-wax containing 3 atomic proportions of chlorine (16 per cent chlorine in the chlor-wax) is reacted with 1 molecular proportion of phenol, may for brevity herein be designated as "wax-phenol (3–16)." Parenthetical expressions of the type (A—B) will be used hereinafter in connection with the alkylated hydroxyaromatic compounds to designate (A) the number of atomic proportions of chlorine in the chloraliphatic material reacted with one mol of hydroxyaromatic compound in the Friedel-Crafts reaction and (B) the percentage of chlorine in the chloraliphatic material. In the above example $A=3$ and $B=16$. The same designation will also apply to the sulfides of the wax-substituted acylated hydroxyaromatic carboxylic acid salts which constitute the ultimate product derived from the wax-phenol.

CARBOXYLATION OF WAX-PHENOL

In forming the carboxylic acid or the alkali metal carboxylate of a wax-phenol of the type obtained by the procedure described above, a preferred method involves, first, the substitution of the phenolic hydrogen with alkali metal, followed by carboxylation with $CO_2$ gas. Because of the high viscosity of the mixtures it is advantageous to dilute the wax-phenol initially with from one to three parts of heavy mineral oil, in which case the finished product is a concentrated mineral oil blend. By the use of mineral oil diluent, wax phenols of higher phenol content can be used in the formation of products of this invention. The formation of a wax-alkali-metal-phenate, for example, may be carried out by diluting 500 parts by weight of wax-phenol obtained according to the foregoing procedure, with 1500 parts by weight of mineral oil of Saybolt viscosity of about 60 seconds at 210° F., and reacting with 16 parts by weight of metallic sodium (or equivalent amount of metallic potassium). The reaction mixture is heated at about 500° F. during a two-hour period with rapid stirring to produce finely divided alkali metal and thereby accelerate the reaction. Wax-substituted alkali metal phenates may also be prepared by reacting the wax-phenol with an alcoholate of the alkali metal such as sodium butylate. For this purpose anhydrous aliphatic alcohols are usually the most suitable; and as an example, 500 parts by weight of wax-phenol (3-16) was reacted with 16 parts by weight sodium in the forms of ethyl or butyl sodium oxide by heating the mixture to about 300° F. during about a one-hour period and allowing the alcohol released in the reaction to distill off.

The wax-sodium phenate obtained according to the foregoing procedures is then carboxylated. This carboxylation may be carried out in various ways, one effective procedure being to heat the wax-sodium phenate in mineral oil blend to a temperature of about 350° F. and introduce $CO_2$ at this temperature. The pressure is gradually raised to about 500 pounds per square inch to complete the reaction at this temperature during a one-hour period. The carboxylation can also be carried out at atmospheric pressure, a suitable procedure consisting of introducing a current of $CO_2$ into the wax-sodium phenate in mineral oil blend at a temperature of about 400° F., the carboxylation requiring about 10 hours, depending somewhat upon the rate of stirring of the mixture.

The product of this step is the sodium carboxylate salt of wax-substituted phenol carboxylic acid (3-16); or in case mineral oil is used as diluent, it is a mineral oil solution of such salt. When completely carboxylated, the mixture loses its gelatinous nature, changing to a fluid homogeneous product. In the absence of diluent, the wax-sodium phenate is changed from a waxy product to a resilient, rubbery material.

This salt may be converted, if desired, to the corresponding carboxylic acid by neutralization with a mineral acid or it may be converted to a sodium phenate-carboxylate salt by reacting with an amount of sodium alcoholate containing sodium equivalent to the hydroxyl hydrogen of the phenol sodium carboxylate.

FORMATION OF THE SULFIDES OF THE PHOSPHATE ESTER OF WAX-PHENOL CARBOXYLIC ACID

In the event the product of the foregoing step is a wax-phenol carboxylic acid, the corresponding sulfides thereof may be obtained by dissolving the acid in a suitable solvent such as carbon disulfide, benzene, chlorbenzene, ethylene dichloride, Stoddard solvent, or the like, and bringing the temperature of the solution up to about 100° F., which is followed by addition of a sulfur halide (mono- or di-) or mixture of sulfur halides during about a ½-hour period. The mixture may then be held at this temperature for about one hour to complete the formation of the sulfide derivative. HCl is evolved in the reaction, resulting in fixation of the sulfur in the aryl nucleus. As regards the temperature of the reaction, it is to be understood that the reaction can be carried out at various temperatures from room temperature up to the boiling point of the solvent, but it is preferable for obtaining light-colored products that the temperature be not too high. The addition of the sulfur halide is controlled so as to prevent over-heating of the mixture by its heat of reaction. This mixture is then water-washed to remove dissolved hydrochloric acid, and the free phenol carboxylic acid may be acylated with phosphorus trichloride as hereinbefore indicated, or if desired it may be acylated after conversion to its corresponding alkali carboxylate salt.

Where the Kolbe synthesis has been employed as the carboxylation procedure, the wax-phenol carboxylic acid may conveniently be obtained, as aforesaid, in the form of the alkali metal phenate-alkali metal carboxylate. The sulfide derivatives can be obtained from this product by treating with sulfur halide without first liberating the free acid, and in this case free HCl is not evolved unless an amount of sulfur halide in excess of the sodium content is used, the HCl being converted to sodium chloride by reaction with the alkali-phenate-carboxylate salt, with formation of the corresponding free wax-substituted hydroxyaromatic (phenol) carboxylic acid which may then be reacted, in succession, with sulfur or sulfur halide (preferably chloride) and an acyl halide, as previously explained, followed by substitution of the carboxyl hydrogen with the desired metal, preferably in the form of an alcoholate as illustrated by the specific example below.

When the alkali-phenate-carboxylate salt of the acid is reached in the manner just described, solvents such as carbon disulfide and ethylene dichloride must be replaced with solvents such as alcohol, benzene, or chlorbenzene to avoid side reactions with the alkali derivative.

The following example illustrates a preferred method of preparing the stannous salt of the phosphite ester (acyl) of wax-phenol carboxylic acid disulfide which is one of the preferred oil-improving agents of the present invention. It is to be understood, however, that my invention is not limited to the details of this specific example which is given merely by way of illustration and from which, taken in connection with the explanations and descriptions given above, the various other procedures and methods which may be followed for making this same product and for making the various other products comprised by the present invention will be apparent to those skilled in the art PREPARATION OF THE STANNOUS SALT OF THE PHOSPHITE ESTER (ACYL) OF WAX-PHENOL CARBOXYLIC ACID DISULPHIDE Reaction mixture

| | Grams |
|---|---|
| Sodium phenate-carboxylate salt of wax phenol acid (3-16) | 100 |
| Mineral oil (as diluent) | 300 |
| Sulfur monochloride | 9.8 |
| Phosphorous trichloride | 6.7 |
| Stannous chloride (anhydrous) | 14 |
| Sodium | 3.36 |

The sodium salt of wax phenol acid in mineral oil blend, is diluted with an equal weight of chlorbenzene and the sulfur monochloride added at about 100° F. at a rate sufficiently slow to prevent an increase in temperature of the reaction mixture by the heat of reaction, the addition of the sulfur monochloride requiring about a half hour period. The phosphorous trichloride is then added at 100° F., after which the sodium in the form of sodium butylate is added, followed by addition of the stannous chloride, whereby stannous butylate is formed. The reaction mixture is then heated to about 250° F. to form the stannous carboxylate salt, and water-washed or filtered through "HiFlo" to remove the sodium chloride formed in the reaction. The reaction mixture is then steam treated at about 300° F. to remove all traces of volatile solvent. The steam vapor is then removed by applying vacuum or running through the mineral oil blend of the product a current of nitrogen to obtain the finished product.

The product of the foregoing specific example is the disulfide of the phosphite ester (acyl) of wax-phenol carboxylic acid in which the carboxyl hydrogen is substituted with its equivalent weight of tin. It may also be termed the stannous carboxylate of the phosphite ester of wax-phenol carboxylic acid disulfide. The procedure to be followed in obtaining the corresponding carboxylate disulfides of metals other than tin will be readily apparent from the foregoing to those skilled in the art, as will also the variations in the procedure necessary to obtain the monosulfide and other polysulfides.

The wax-substituted compositions of the present invention obtained by the exemplary procedures described above are, as the result of their relatively low "phenolic ratio" or combined phenol content, all oil-miscible or oil-soluble products. Although products of this type are designated herein as preferred because of their multifunctional oil-improving properties, it is again emphasized that the invention is not limited to these oil-miscible wax-substituted compositions but is inclusive of this entire field of products irrespective of oil-miscibility.

Compounds or compositions of both the oil-miscible and non-miscible types have been prepared, and of the oil-miscible products synthesized all have been tested as additive agents for viscous mineral oils and have been found to be of multifunctional activity, improving the pour point and viscosity index and inhibiting oxidation of viscous mineral oil fractions. The following list (table) is illustrative of the various oil-miscible compositions of the present invention which have been prepared and tested to demonstrate their value as additive agents for viscous mineral oils.

*Table*

Stannous carboxylate salt of phthalyl ester of wax phenol carboxylic acid disulfide (3–16)
Stannous carboxylate salt of phosphite ester of wax phenol carboxylic acid disulfide (3–16)
Cobaltous carboxylate salt of phosphite ester of wax phenol carboxylic acid disulfide (3–16)
Stannous carboxylate salt of phosphite ester of wax phenol carboxylic acid tetrasulfide (3–14)
Stannous carboxylate salt of thiophosphate ester of wax phenol carboxylic acid disulfide (3–16)
Cobaltous carboxylate salt of phosphite ester of diamyl phenol carboxylic acid disulfide
Barium carboxylate salt of phosphite ester of wax phenol carboxylic acid disulfide (3–14)

This application is a continuation in part of my co-pending application Serial Number 330,065, filed April 17, 1940, Patent No. 2,355,240.

I claim:

Stannous carboxylate of the phosphite ester of paraffin-wax-phenol carboxylic acid disulfide.

ORLAND M. REIFF.